United States Patent Office 3,178,405
Patented Apr. 13, 1965

3,178,405
WATER-INSOLUBLE MONOAZO DYESTUFFS
Ernest Merian, Bottmingen, Basel-Land, Switzerland
No Drawing. Filed Feb. 16, 1961, Ser. No. 89,626
Claims priority, application Switzerland, July 25, 1956,
35,860
4 Claims. (Cl. 260—207)

The present invention relates to new water insoluble monoazo dyestuffs which correspond to the formulae

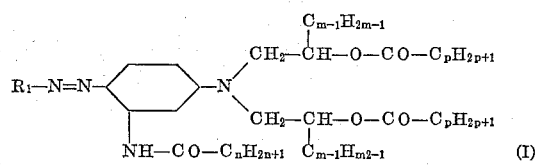
(I)

wherein $R_1$ represents the radical of a diazo component free from carboxylic and sulfonic acid groups selected from the group consisting of a diazo component of the benzene series; and
$m$, $n$ and $p$ are each positve whole numbers of at most 2.

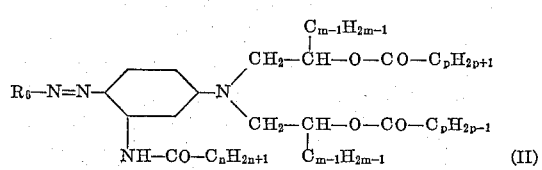
(II)

wherein $R_6$ is a 4-nitrobenzene diazo component free from carboxylic and sulfonic acid groups; and
$m$, $n$ and $p$ are each positive whole numbers of at most 2.

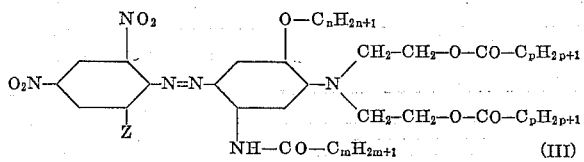
(III)

wherein

Z is a member selected from chlorine, bromine and hydrogen; and
$m$, $n$ and $p$ are each a positive whole number of at most 2.

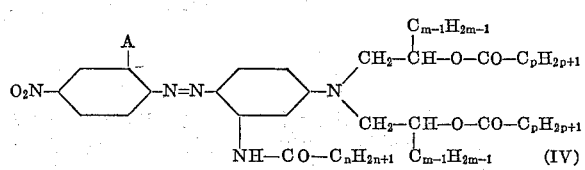
(IV)

wherein

A represents a member selected from the group consisting of hydrogen, chlorine, bromine, the cyano group and the methoxy group and $m$, $n$ and $p$ are each positive whole numbers of at most 2 and

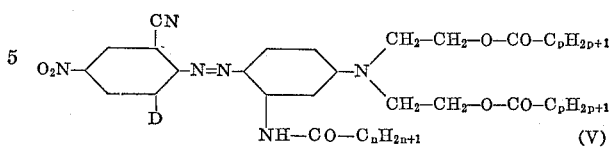
(V)

wherein

D represents a member selected from the group consisting of chlorine and bromine; and
$n$ and $p$ are each positive whole numbers of at most 2.

Some especially valuable individuals are the dyestuffs of the formulae (a)
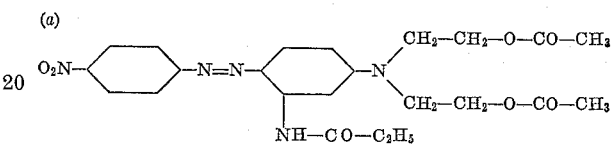

(b)
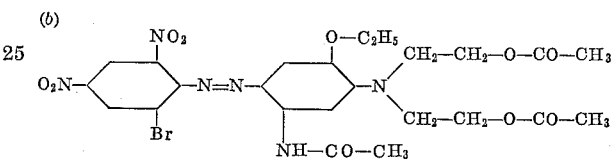

(c)
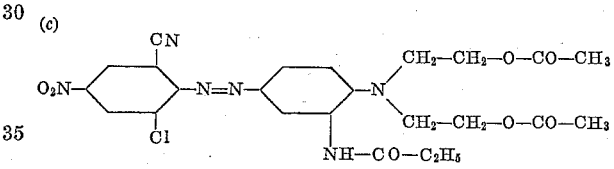

These new water-insoluble monoazo dyestuffs possess very good building-up properties on terephthalic acid ester fibers ("Terylene," "Dacron," registered trademarks) and in part also on celulose ester fibers (e.g. acetate rayon, triacetate rayon), synthetic polyamide fibers ("Nylon," "Perlon," registered trademarks), polyvinyl fibers, and polyacrylonitrile fibers ("Orlon," "Dynel," "Acrilan," registered trademarks). The orange, red, violet or blue dyeings thus obtained exhibit very good fastness to light, washing, perspiration, gas fumes and sublimation. Many of the new dyestuffs are also suitable for coloring oils, lacquer media and synthetic resins, and for dopedyeing man-made fibers. Some of these dyestuffs are slightly soluble in organic solvents and find therefore also employment as pigment dyestuffs.

The invention also relates to a process for the production of the new water-insoluble monoazo dyestuffs defined above. This process comprises coupling 1 mol of the diazo compound of an amine of the benzene series which is free from carboxylic and sulfonic acid groups, for example 1 mol of the diazo compound of an amine of the formula

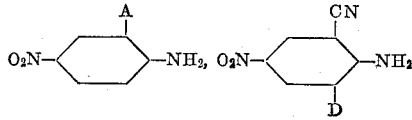

or

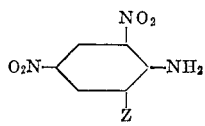

wherein A, D and Z have the aforesaid meanings, with 1 mol of a tertiary amine of the formula

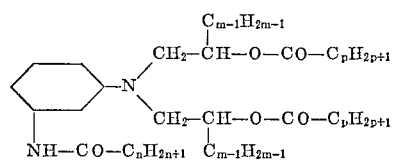

or

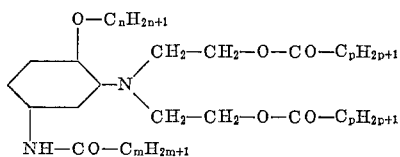

wherein $m$, $n$ and $p$ have the aforesaid meanings.

A second operating procedure comprises acylating a monoazo compound of the formula

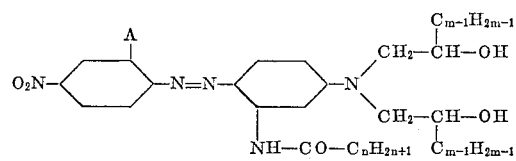

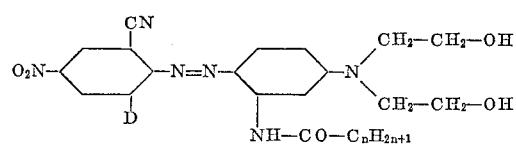

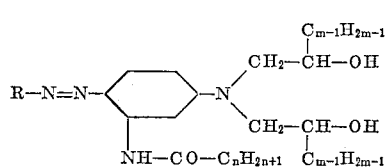

or

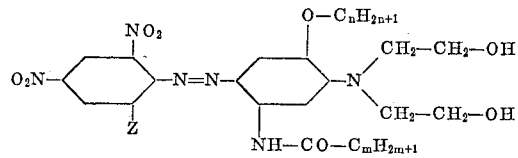

wherein the amino group attached in the ortho-position to the azo group may be acylated before or during acylation of the hydroxy groups, with a functional derivative of an aliphatic carboxylic acid of the formula

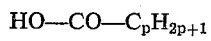

wherein $p$ has the previously named meaning.

Among the amines which conform to the present definition and are suitable for the preparation of the diazo compounds, the following may be mentioned; of the benzene series: 1-amino-4-nitrobenzene, 1-amino-4-alkylsulfonylbenzene and its derivatives containing one substituent in the position 2 or two substituents in the positions 2 and 6.

The coupling of the diazo compound with the azo component according to the first operating procedure of the process is carried out preferably in an acid medium, advantageously in the presence of acid-binding agents. The monoazo dyestuffs which separate out are filtered off and washed.

The acylation of the monoazo compounds according to the second operating procedure of the process is carried out in known manner with functional derivatives of the aliphatic carboxylic acid defined above. If desired an acid-binding agent and/or a diluent which does not influence the reaction may be added. It is often useful to work at an elevated temperature. The monoazo dyestuffs thus obtained are isolated according to one of the usual operations: filtration, partial or total evaporation of the solvent and filtration, precipitation from the solvent by means of a suitable agent and filtration.

The working-up of the monoazo dyestuffs into dyeing preparations can be carried out in many ways. For instance, the dried dyestuff is ground with a suitable dispersing agent, if desired in the presence of fillers, or kneaded in the form of a paste with a dispersing agent and then dried in vacuo or through a sprayer.

The new dyeing preparations are dyed on hydrophobic fibers from suspension, preferably in the presence of dispersing agents and at an elevated temperature. By mixing two or several monoazo dyestuffs of the invention the drawing capacities of the dyestuffs can be further improved in some cases.

In the following examples the parts and percentages are by weight; the temperatures are given in degrees centigrade and the melting points are uncorrected.

EXAMPLE 1

5 parts of 4-nitro-2'-acetylamino-4'-N.N-di-(hydroxyethyl)-amino-1.1'-azobenzene are heated for 2 hours under reflux with 25 parts of acetic anhydride. The reaction mixture is then allowed to cool and diluted with 200 parts of methanol. Then 150 parts of water are added to the mixture, whereby the new dyestuff becomes precipitated. It is filtered off with suction, washed with water and dried.

The new dyestuff melts at 83° in the crude state. From boiling methanol it is obtained as red crystals melting at 120°.

Analysis:

|  | Calculated for $C_{22}H_{25}O_7N_5$ | Found |
|---|---|---|
| C, percent | 56.04 | 56.29 |
| H, percent | 5.35 | 5.53 |
| O, percent | 23.75 | 23.72 |
| N, percent | 14.85 | 14.80 |

The product has therefore very probably the constitution:

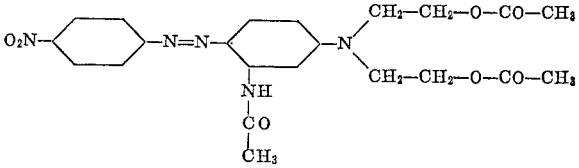

A dyebath is prepared with 1 part of the dyestuff dispersed with the aid of Turkey red oil, 6 parts of a fatty alcohol sulfonate and 3000 parts of water. 100 parts of acetate rayon are introduced at room temperature into the bath, which is heated to 80° in the course of one hour and maintained for one hour at 80°. After this time the dyeing process is completed. The dyed acetate rayon is removed from the bath, rinsed and dried. It is dyed in scarlet red shades which possess excellent fastness properties.

In order to improve its dispersibility the dyestuff can be ground previously to the dyeing process with suitable wetting, dispersing or emulsifying agents, preferably in the presence of inorganic salts e.g. sodium sulfate. It also can be in the form of an aqueous paste intimately mixed with a dispersing agent and by suitable drying converted into a dyeing preparation.

Synthetic polyamide fibers are dyed in the same manner at 90–100°, terephthalic acid esters at 120–130° under pressure or at 90–100° in the presence of carriers.

EXAMPLE 2

8 parts of 4-nitro-2-cyano-2'-acetylamino-4'-N.N-di-(hydroxyethyl)-amino-1.1'-azobenzene are heated for 2 hours under reflux with 45 parts of acetic anhydride. The solution is then allowed to cool and diluted with 200 parts of methanol. A little impurity melting at 154° is removed by filtration. The filtrate is diluted by dropwise addition of 300 parts of water, whereby the new dyestuff separates out. It is filtered off with suction, washed and dried. In the crude state it melts at 74°. From aqueous dispersions it draws very well on acetate rayon, triacetate rayon and polyester fibers, giving red-violet shades which are fast to light, gasfumes, washing, perspiration and sublimation, and fully dischargeable.

Dope-dyeing of acetate rayon can be carried out as follows:

100 parts of acetylcellulose are added to 300 parts of a solvent mixture containing 93% acetone and 7% methanol, mixed for a short time and allowed to swell during the night. 0.5 part of the monoazo dyestuff obtainable according to the details given in the above example is dissolved in 60 parts of the same solvent mixture by simple shaking. This solution is added to the acetylcellulose solution and the mixture is stirred in an open vessel until 60 parts of the solvent have evaporated. The dyed mass is then pressed into the spinning pot and spun in the known manner. The filaments thus obtained are dyed in a red-violet shade which possesses good fastness properties.

EXAMPLE 3

21.1 parts of 4-nitro-2-chloro-2'-acetylamino-4'-N.N-di-(hydroxyethyl)-amino-1.1'-azobenzene (M.P. 180°) are heated for 4 hours under reflux with 80 parts of acetic anhydride. The deep red solution is allowed to cool and is evaporated to dryness in vacuo. The residue is taken up in 100 parts of methanol and digested at room temperature. The new dyestuff is filtered off and dried; it melts at 127°. The filtrate contains a by-product melting at 192° which possesses only poor building-up properties on hydrophobic fibers. The dyestuff melting at 127° is probably the 4-nitro-2-chloro-2'-acetylamino-4'-N.N-di-(acetoxyethyl)-amino-1.1'-azobenzene, which dyes acetate rayon, triacetate rayon and polyester fibers in ruby red, very fast shades.

EXAMPLE 4

17 parts of 1-amino-2-methoxy-4-nitrobenzene are stirred for 2 hours in a solution of 135 parts of water and 27 parts of 30% hydrochloric acid. After the addition of 100 parts of ice a solution of 7 parts of sodium nitrite in 25 parts of water is added dropwise to the suspension. The diazotization is completed as soon as all has gone into solution. A little impurity is removed by filtration and the filtered diazo solution is mixed with 36 parts of 1-N.N-di-(acetoxyethyl)-amino-3-acetylaminobenzene. The mixture is stirred until the presence of the diazo compound is no longer indicated. The new dyestuff is then filtered off, washed and dried; it melts at 170–176° and dyes acetate rayon, triacetate rayon, polyester fibers and synthetic polyamide fibers in red, very fast shades.

The following Table 1 contains further monoazo dyestuffs which are obtainable according to the details given in the Examples 1 to 4. They correspond to the formula

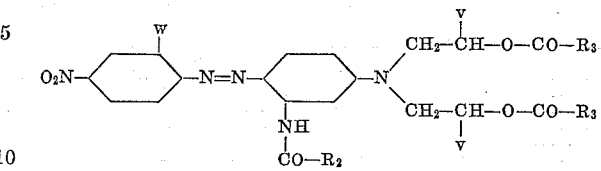

and are characterized in the table by the symbols $w$, $v$, $R_2$ and $R_3$, by their melting point and by the shade of their solution in ethanol.

*Table 1*

| Ex. No. | w | v | $R_2$ | $R_3$ | M.P. | Shade of the solution in ethanol |
|---|---|---|---|---|---|---|
| 5 | H | H | $C_2H_5$ | $CH_3$ | 126° | Scarlet. |
| 6 | H | H | $C_2H_5$ | $C_2H_5$ | 108° | Do. |
| 7 | H | H | $CH_3$ | $C_2H_5$ | 118° | Do. |
| 8 | O—$CH_3$ | H | $CH_3$ | $C_2H_5$ | 143° | Red. |
| 9 | H | $CH_3$ | $CH_3$ | $CH_3$ | 88° (crude) | Scarlet. |
| 10 | $SO_2$—$CH_3$ | H | $CH_3$ | $CH_3$ | 136° | Violet. |

If substituted 1-diazo-4-alkylsulfonylbenzenes (such as 1-diazo-2-chloro-4-methylsulfonylbenzene) are used instead of substituted 1-diazo-4-nitrobenzenes, the shade of the corresponding dyestuffs is shifted to more yellowish shades and the light-fastness on polyamide fibers is improved. By combining diazo compounds such as 1-diazo-2.4-dicyanobenzene or 1-diazo-2-chloro-4-cyanobenzene with the same coupling components, red disperse dyestuffs are obtained which possess especially pure shades and good fastness to light and washing.

With diazo compounds such as 1-diazo-4-nitrobenzene-2-sulfonic acid fluoride, 1-diazo-2.4-dinitro-6-chlorobenzene, 1-diazo-2.4-dinitro-6-cyanobenzene, 1-diazo-2.4-dinitrobenzene-6-sulfonamides (e.g. 1-diazo-2.4-dinitrobenzene-6-sulfonethylamide) deeper colored, i.e. violet and blue dyestuffs are obtained.

In some cases the drawing capacity on acetate rayon and/or the melting point can be raised in the aforenamed dyestuffs if the coupling components are replaced by 1-bis-(acetoxyethyl)-amino-2-methoxy-5-acetylaminobenzene.

EXAMPLE 11

11 parts of 1-di-(hydroxyethyl)-amino-3-aminobenzene (B.P. 212° at 0.2 mm. Hg) are boiled for 10 hours under reflux with 30 parts of acetic anhydride. After cooling the liquid thus obtained is added at 0° to a diazo solution of 7 parts of 1-amino-4-nitrobenzene. The reaction mass looks first resinous; it is set to pH 7 by means of sodium acetate. After 30 minutes the aqueous layer is discarded. The dyestuff which is still sticky is stirred with 100 parts of methanol, whereby it becomes crystalline. It can be filtered off and dried at 60°. The crystalline powder melts at 116–120°; the mixed melting point also corresponds very well to that of the dyestuff of Example 1.

In the following Table 2 further water-insoluble monoazo dyestuffs are listed. They correspond to the formula

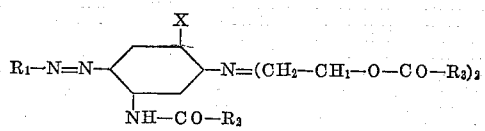

and are characterized by the symbols $x$, $R_1$, $R_2$ and $R_3$, and by the shade of their solution in ethanol. The dyeings in or on acetate rayon exhibit the same shade as the solutions in ethanol. The dyeings on synethetic polyamide fibers are similar or, when the diazo component contains a nitro group, more bluish.

Table 2

| Ex. No. | $R_1$ | x | $R_2$ | $R_3$ | Shade of the solution in ethanol |
|---|---|---|---|---|---|
| 12 | 4-methylsulfonyl-2-chlorophenyl | $OCH_3$ | $CH_3$ | $CH_3$ | Orange. |
| 13 | 4-nitro-2-bromophenyl | H | $C_2H_5$ | $CH_2$—O—$CH_3$ | Red. |
| 14 | 2,4-dinitro-6-chlorophenyl | $OC_2H_5$ | $CH_3$ | $CH_3$ | Blue. |
| 15 | 4-nitro-2-fluorosulfonylphenyl | H | $CH_3$ | $CH_3$ | Violet. |
| 16 | 2,4-dicyanophenyl | H | $CH_3$ | $CH_3$ | Do. |
| 17 | 4-cyano-2-chlorophenyl | $C_2H_5$ | $CH_3$ | $CH_2Cl$ | Red. |
| 18 | 4-nitro-2-chloro-6-cyanophenyl | $OCH_3$ | $C_2H_5$ | $C_2H_5$ | Blue. |
| 19 | 4-nitro-2-bromo-6-cyano-phenyl | H | $CH_3$ | $CH_3$ | Reddish blue. |
| 20 | ....do.... | H | $CH_3$ | $C_2H_5$ | Do. |
| 21 | ....do.... | H | $C_2H_5$ | $C_2H_5$ | Do. |
| 22 | 4-nitro-2-chloro-6-cyano-phenyl | H | $CH_3$ | $CH_3$ | Do. |
| 23 | ....do.... | $OCH_3$ | $CH_3$ | $C_2H_5$ | Do. |
| 24 | ....do.... | H | $C_2H_5$ | $C_2H_5$ | Do. |
| 25 | 2,4-dinitro-6-chlorophenyl | $OCH_3$ | $C_2H_5$ | $C_2H_5$ | Greenish blue. |
| 26 | ....do.... | $OCH_3$ | $C_2H_5$ | $CH_3$ | Do. |
| 27 | ....do.... | $OCH_3$ | $CH_3$ | $C_2H_5$ | Do. |
| 28 | ....do.... | $OC_2H_5$ | $C_2H_5$ | $C_2H_5$ | Do. |
| 29 | ....do.... | $OC_2H_5$ | $C_2H_5$ | $CH_3$ | Do. |
| 30 | ....do.... | $OC_2H_5$ | $CH_3$ | $C_2H_5$ | Do. |
| 31 | 2,4-dinitro-6-bromophenyl | $OCH_3$ | $C_2H_5$ | $C_2H_5$ | Do. |
| 32 | ....do.... | $OCH_3$ | $C_2H_5$ | $CH_3$ | Do. |
| 33 | ....do.... | $OCH_3$ | $CH_3$ | $C_2H_5$ | Do. |
| 34 | ....do.... | $OC_2H_5$ | $C_2H_5$ | $C_2H_5$ | Do. |
| 35 | ....do.... | $OC_2H_5$ | $C_2H_5$ | $CH_3$ | Do. |
| 36 | ....do.... | $OC_2H_5$ | $CH_3$ | $C_2H_5$ | Do. |
| 37 | 2,4-dinitrophenyl | $OCH_3$ | $C_2H_5$ | $C_2H_5$ | Do. |
| 38 | ....do.... | $OCH_3$ | $C_2H_5$ | $CH_3$ | Do. |
| 39 | ....do.... | $OCH_3$ | $CH_3$ | $C_2H_5$ | Do. |
| 40 | ....do.... | $OC_2H_5$ | $C_2H_5$ | $C_2H_5$ | Do. |
| 41 | ....do.... | $OC_2H_5$ | $C_2H_5$ | $CH_3$ | Do. |
| 42 | ....do.... | $OC_2H_5$ | $CH_3$ | $C_2H_5$ | Do. |
| 43 | 4-nitro-2-cyanophenyl | H | $C_2H_5$ | $C_2H_5$ | Red. |
| 44 | ....do.... | H | $C_2H_5$ | $CH_3$ | Do. |
| 45 | ....do.... | H | $CH_3$ | $C_2H_5$ | Do. |
| 46 | 4-nitro-2-chlorophenyl | H | $C_2H_5$ | $C_2H_5$ | Do. |
| 47 | ....do.... | H | $C_2H_5$ | $CH_3$ | Do. |
| 48 | ....do.... | H | $CH_3$ | $C_2H_5$ | Do. |
| 49 | 4-nitro-2-bromophenyl | H | $C_2H_5$ | $C_2H_5$ | Do. |
| 50 | ....do.... | H | $CH_3$ | $C_2H_5$ | Do. |
| 51 | 4-nitro-2-methoxyphenyl | H | $C_2H_5$ | $CH_3$ | Do. |
| 52 | ....do.... | H | $C_2H_5$ | $C_2H_5$ | Do. |
| 53 | 4-nitro-2-trifluoromethylphenyl | H | $CH_3$ | $CH_3$ | Do. |
| 54 | ....do.... | H | $C_2H_5$ | $CH_3$ | Do. |
| 55 | ....do.... | H | $CH_3$ | $C_2H_5$ | Do. |
| 56 | ....do.... | H | $C_2H_5$ | $C_2H_5$ | Do. |

Furthermore dyestuffs of the formula

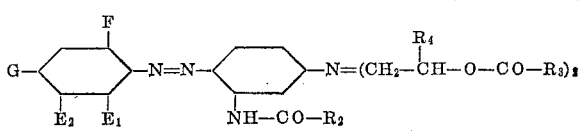

and wherein the symbols E, F, G, $R_2$, $R_3$ and $R_4$ may have the following meaning ($E_1$ and $E_2$ being hydrogen when not otherwise mentioned).

In Table 3 some monoazo dyestuffs of the formula

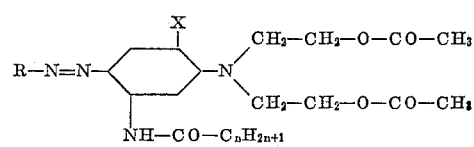

are enumerated. They give dyeings having outstanding fastness to light, wet treatments and sublimation, and

| Ex. No. | E | F | G | $R_2$ | $R_3$ | $R_4$ | Shade |
|---|---|---|---|---|---|---|---|
| 57 | H | H | $NO_2$ | $CH_3$ | $CH_3$ | $CH_3$ | Scarlet. |
| 58 | H | H | $NO_2$ | $C_2H_5$ | $CH_3$ | $CH_3$ | Do. |
| 59 | $E_1$=Cl | $CF_3$ | $NO_2$ | $CH_3$ | $CH_3$ | H | Do. |
| 60 | $E_1$=Br | Br | $NO_2$ | $CH_3$ | $CH_3$ | H | Do. |
| 61 | H | H | $SO_2$—$CH_3$ | $CH_3$ | $CH_3$ | H | Orange. |
| 62 | H | Cl | $SO_2$—$CH_3$ | $CH_3$ | $CH_3$ | H | Scarlet. |
| 63 | H | Br | $SO_2$—$CH_3$ | $CH_3$ | $CH_3$ | $CH_3$ | Do. |
| 64 | H | CN | $SO_2$—$CH_3$ | $CH_3$ | $CH_3$ | H | Do. |
| 65 | H | CN | $SO_2$—$C_2H_5$ | $C_2H_5$ | $C_2H_5$ | H | Do. |
| 66 | H | Cl | $SO_2N(CH_3)_2$ | $C_2H_5$ | $CH_3$ | H | Do. |
| 67 | H | Cl | $SO_2N(C_2H_5)_2$ | $C_2H_5$ | $CH_3$ | $CH_3$ | Do. |
| 68 | $E_2$=Cl | Cl | $SO_2$—$CH_3$ | $CH_3$ | $CH_3$ | H | Do. |
| 69 | $E_2$=Cl | Cl | $SO_2N(CH_3)_2$ | $CH_3$ | $CH_3$ | H | Do. |
| 70 | H | Cl | CN | $CH_3$ | $CH_3$ | H | Do. |
| 71 | H | CN | CN | $CH_3$ | $CH_3$ | H | Do. |
| 72 | $E_1$=Cl | CN | $NO_2$ | $CH_3$ | $CH_3$ | $CH_3$ | Reddish blue. |
| 73 | $E_1$=Br | CN | $NO_2$ | $CH_3$ | $CH_3$ | $CH_3$ | Do. |
| 74 | $E_1$=$CF_3$ | CN | $NO_2$ | $CH_3$ | $CH_3$ | H | Do. |
| 75 | $E_1$=$CF_3$ | $NO_2$ | $NO_2$ | $CH^3$ | $CH_3$ | H | Do. | reserve cotton and wool when treated with hydrosulfite well.

Table 3

| R | X | n | Melting point in °C. | Shade |
|---|---|---|---|---|
| 4-nitro-2,6-dichlorophenyl | H | 2 | 97 | Reddish violet. |
| 4-nitro-2-chlorophenyl | —OC$_2$H$_5$ | 1 | 139 | Bluish red. |
| 2,4-dinitrophenyl | —OC$_2$H$_5$ | 1 | 167 | Greenish blue. |
| Do | —OCH$_3$ | 1 | 160 | Do. |
| 4-nitro-2,6-dichlorophenyl | —OCH$_3$ | 1 | 90 | Violet. |
| Do | —OC$_2$H$_5$ | 1 | 125 | Do. |
| 4-nitro-2-cyanophenyl | H | 2 | 131 | Bluish red. |
| 2,4-dinitrophenyl | H | 2 | 160 | Do. |
| 2,4-dinitro-6-bromophenyl | H | 2 | 118 | Reddish blue. |
| 2,4-dinitro-6-chlorophenyl | H | 2 | 98 | Do. |
| 2,4-dinitro-6-cyanophenyl | H | 2 | 159 | Do. |
| 4-nitro-2-bromo-6-cyanophenyl | H | 2 | 130 | Do. |
| 4-nitro-2-chloro-6-cyanophenyl | H | 2 | 140 | Do. |
| 2,4-dinitro-6-bromophenyl | —O—C$_2$H$_5$ | 1 | 144 | Greenish blue. |
| 2,4-dinitro-6-bromophenyl | —O—CH$_3$ | 1 | 137 | Do. |
| 2,4-dinitro-6-chlorophenyl | —O—CH$_3$ | 1 | 136 | Do. |

Formulae of representative dyestuffs of the foregoing examples are:

EXAMPLE 2

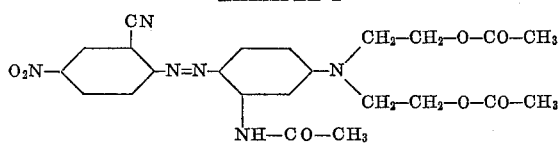

EXAMPLE 3

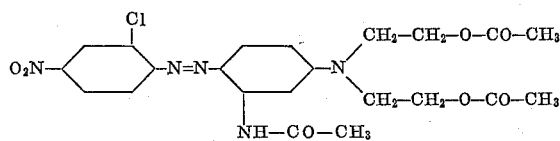

EXAMPLE 4

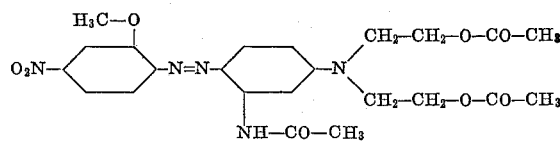

The present application is a continuation-in-part of copending application Serial No. 673,136, filed July 22, 1957, now abandoned, for Water-Insoluble Monoazo Dyestuffs.

Having thus disclosed the invention, what is claimed is:

1. Monoazo dyestuff of the formula

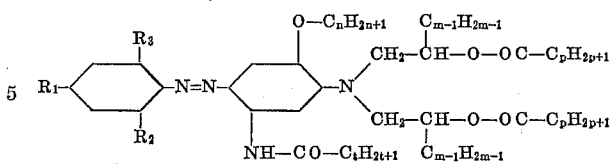

wherein
R$_1$ is a member selected from the group consisting of NO$_2$, CN, and SO$_2$-(lower)alkyl,
R$_2$ is a member selected from the group consisting of H, Cl, Br, and NO$_2$,
R$_3$ is a member selected from the group consisting of H, Cl, and Br,
m, n, p and t each being a positive whole integer of at most 2.

2. Monoazo dyestuffs which correspond to the formula

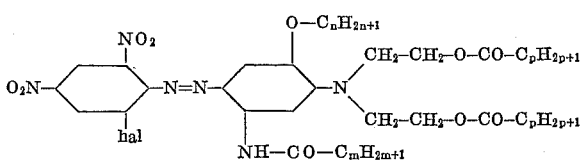

wherein
hal is a halogen atom with an atomic number from 17 to 35 inclusive;
and m, n and p are each a positive whole number of at most 2.

3. Monoazo dyestuff of the formula

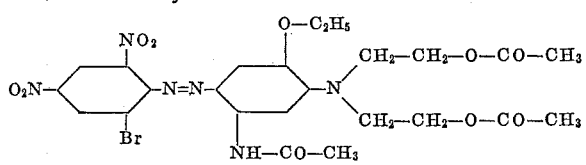

4. Monoazo dyestuff of the formula

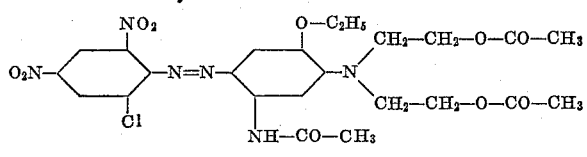

References Cited in the file of this patent
UNITED STATES PATENTS

| 2,155,755 | Felix et al. | Apr. 25, 1939 |
| 2,283,327 | Felix et al. | May 19, 1942 |
| 2,384,734 | Felix et al. | Sept. 11, 1945 |
| 2,659,719 | Dickey et al. | Nov. 17, 1953 |
| 2,785,157 | Straley et al. | Mar. 12, 1957 |

Disclaimer 3,178,405.—*Ernest Merian*, Bottmingen, Basel-Land, Switzerland. WATER-INSOLUBLE MONOAZO DYESTUFFS. Patent dated Apr. 13, 1965. Disclaimer filed June 2, 1969, by the inventor.

Hereby disclaims the terminal portion of the term of the patent subsequent to Feb. 25, 1981.

[*Official Gazette October 14, 1969.*]